2,948,704

ALKYLATED INDANOLS AS DETERIORATION RETARDERS FOR RUBBERS

Roger E. Morris, Cuyahoga Falls, Ohio, assignor to The B. F. Goodrich Company, New York, N.Y., a corporation of New York No Drawing. Filed Sept. 10, 1956, Ser. No. 608,699

6 Claims. (Cl. 260—45.95)

This invention relates to the preservation and protection of organic materials subject to deterioration on aging and/or in service, and more particularly to the preservation and protection of rubber and rubber products, by the incorporation into such materials and products of one or more of a new class of chemical compounds.

The new class of chemicals comprises the reaction products of an indanol or a substituted indanol with an olefin, which reaction products are sometimes herein for convenience referred to as "alkylated indanols" and which reaction products applicant has discovered to function as extremely effective deterioration retarders for organic materials and especially for rubber and rubber products.

In vulcanized rubber products subjected in service to continuous flexing and/or to heat, as for example, a rubber tire, either pneumatic or solid, and a rubber belt, especially a belt operating on small pulleys and/or at high speeds, the new class of chemicals of this invention has been found to impart to the vulcanized rubber remarkably high anti-flex-cracking properties and excellent heat stabilizing properties, as well as extremely effective resistance to loss of tensile strength, elongation and other desirable properties of newly vulcanized rubber products. The deterioration retarders of this application are, furthermore, non-staining and non-discoloring, and hence are particularly well adapted for use in white or light rubber stocks, and are outstanding when used in white sidewall stocks of automobile tires and in the rubber stocks contiguous to the white sidewalls.

The indanols utilized as starting reactants in the production of the alkylated indanol deterioration retarders of this application are of the general formula

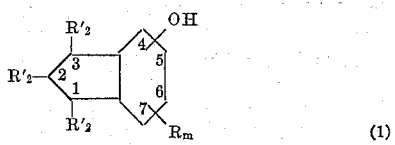
(1)

wherein the OH group is attached to a carbon atom of the phenyl ring of the indan group in either the 4- or the 5-position, on in either the 7- or the 6-position; each of the carbon atoms of the phenyl ring which has a replaceable hydrogen atom attached thereto and is positioned ortho or para to the carbon atom to which the OH group is attached being a carbon atom in an open reactive position; R represents a monovalent substituent selected from the class consisting of hydrogen and alkyl and aralkyl radicals having from 1 to 8 carbon atoms; $m$ is 1; and R' represents a monovalent substituent selected from the class consisting of hydrogen and alkyl radicals having from 1 to 8 carbon atoms, each R' attached to the indan group in the divalent 1-, 2- and 3-positions, and each R and R' representing the same or a different monovalent substituent.

The structure of either of the symmetrical forms $a$

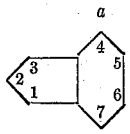

and $b$

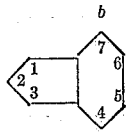
(2)

is an "indan" group, from which structures it will be noted that the 4- and 7-positions and the 5- and 6-positions are corresponding positions. In order to simplify the description herein, reference will be made herein only to the $a$ structure, with the understanding that the description applies equally as well to the $b$ structure, and 4-hydroxy indan and 5-hydroxy indan (also referred to as 4-indanol and 5-indanol) include 7-hydroxy indan and 6-hydroxy indan (7-indanol and 6-indanol), respectively.

In the indanols of above Formula 1, $m$ may be 0 or 1. Where $m$ is 0, there are two open reactive carbon atoms in the phenyl ring, ortho and/or para to the OH group. Thus, where the OH group is attached to a carbon atom in the 4-position, the carbon atoms in the ortho 5-position and in the para 7-position are open reactive carbon atoms, and make possible the attachment of an olefin group in either the 5-position or the 7-position, or both. Similarly, where the OH group is attached to a carbon atom in the 5-position, the carbon atoms in the ortho 4-position and in the ortho 6-position are open reactive carbon atoms, and make possible the attachment of an olefin group in either the 4-position or in the 6-position, or both, with the 6-position being more highly reactive. However, where $m$ is 1, the radical R is attached to one of the two open reactive carbon atoms in the phenyl ring, all as above set forth, leaving the other reactive carbon atom open for the attachment of the olefin group.

The indanols which have been found to be preferred as starting compounds in the production of the deterioration retarders of this application are those in which the OH group is attached to a carbon atom of the indan group in either the 4- or the 5-position and include both the unsubstituted indanols, such as 4-indanol and 5-indanol, in which, in Formula 1 above, $m$ is zero and each R' is a hydrogen atom, and also the substituted indanols in which, in Formula 1 above, $m$ may be 1 and/or one or more of the six R's may be radicals within the scope of R' and the remaining R's, if any, hydrogen atoms. The following three classes of indanols are hereinbelow noted:

(a) Among the indanols of the general Formula 1 in which $m$ is 0 and each R' is a hydrogen atom, and which are useful as starting reactants in the production of the deterioration retarders of this invention are 4-indanol and 5-indanol.

(b) Among the indanols of the general Formula 1 above, in which $m$ is 1 and each R' is a hydrogen atom, and which are useful as starting reactants in producing the deterioration retarders of this invention, are, to enumerate certain typical examples, the following: 5-methyl-4-indanol, 7-methyl-4-indanol, 4-methyl-5-indanol, 6-methyl-5-indanol, and higher homologues including radicals within the above definition of R, such as ethyl, the propyls, butyls, amyls, hexyls, heptyls, octyls, etc.

(c) Among the indanols of the general Formula 1 above in which one or more of the R's attached to carbon atoms in the 1-, 2- and/or 3-positions of the indan group are radicals within the definition of R' above, and which are useful as starting reactants in the production of the deterioration retarders of this invention are 1-methyl-4-indanol, 1,1-dimethyl-4-indanol, 1,3-dimethyl-4-indanol, 1,1,3-trimethyl-4-indanol, 1,1,5-trimethyl-4-indanol, 1,1,7-trimethyl-4-indanol, 1,1,3,5-tetramethyl-4-indanol, 1,1,3,7-tetramethyl-4-indanol, 1,1-dimethyl-3-isopropyl-4-indanol, 1,1-dimethyl-3-ispropyl-5-t-butyl-4-indanol, 1-methyl-5-indanol, 1,1-dimethyl-5-indanol, 1,3-dimethyl-5-indanol, 1,1,3-trimethyl-5-indanol, 1,1,4-trimethyl-5-indanol, 1,1,6-trimethyl-5-indanol, 1,1,3,4-tetramethyl-5-indanol, 1,1,3,6-tetramethyl-5-indanol, 1,1-dimethyl-3-isopropyl-5-indanol, 1,1-dimethyl-3-isopropyl-4-t-butyl-5-indanol, and similar higher homologues, such as ethyl, the propyls, butyls, amyls, hexyls, heptyls, octyls, etc.

The hydrocarbon substituted indanols indicated in the two preceding paragraphs (b) and (c) and similar hydrocarbon substituted indanols, are sometimes in the specification and in the claims of this application referred to as "alkyl indanols," using the term "alkyl" in a broad sense to include all hydrocarbon radicals within the definition of R and R' as above set out.

It is to be understood that the above indicated indanols are illustrative only and are not to be considered in limitation of the invention of this application.

The olefins employed for "alkylation," using this term in a broad sense commonly employed in industry, are represented by the general formula

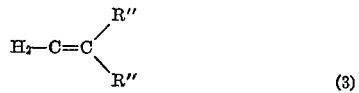

(3)

wherein R'' represents a monovalent substituent consisting of hydrogen and a radical such as alkyl and aralkyl, having from 1 to 8 carbon atoms, and may be any olefin of a natural or synthetic source, or mixtures thereof. Preferably an alpha-olefin is employed, such as ethylene, the propylenes, diisopropylene, the butylenes, diisobutylene, and higher homologues thereof, as well as the cyclic-substituted olefins, such as styrene, alpha-methyl styrene, and also alpha-olefins obtained from the cracking of petroleum fractions.

The indanols of Formula 1 above and the olefins of Formula 3 above, according to the invention of this application, react to produce alkylated indanols of the following general formula:

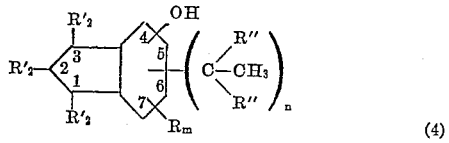

(4)

wherein the OH, R, R' and R'' and m have the same significance as in Formulas 1 and 3 above, n represents an integer either 1 or 2, and the sum of m and n is an integer from 1 to 2.

For convenience in the description in the specification and claims of this application, the

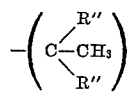

group is termed an "alkylating" group and its presence in a compound containing such group is termed an "alkylated" compound. By way of illustration, the reaction of 5-indanol and isobutylene, in substantially molar proportions, normally produces 6-t-butylated-5-indanol, and from the reaction of 1 mole of 5-indanol with 2 or more moles of isobutylene some 4,6-di-t-butylated-5-indanol may be produced. Again, the reaction of 6-methyl-5-indanol with isobutylene normally yields 6-methyl-4-t-butylated-5-indanol or, expressed in an equivalent way, 4-t-butylated-6-methyl-5-indanol.

The alkylated indanols which have been found to be preferable as deterioration retarders in the invention of this application are those in which the OH group is attached to a carbon atom of the indan group in either the 4- or the 5-position, and include both the reaction products of olefins with unsubstituted indanols and the reaction products of olefins with "hydrocarbon substituted indanols" of the character hereinabove described.

In the reaction of an olefin with an unsubstituted 4-indanol, where, in the resulting alkylated-4-indanols (see Formula 4 above) each R' is a hydrogen atom and R is a radical within the definition of R above, herein termed "alkyl" using that term in a broad sense to include all hydrocarbon radicals within the definition of R, as explained above (1) Where m is zero and n is 1, the alkylated-4-indanols produced are 5-alkylated-4-indanol, 7-alkylated-4-indanol;

(2) Where m is zero and n is 2, the alkylated-4-indanol produced is 5,7-dialkylated-4-indanol; and (3) Where m is 1 and n is 1, the alkylated-4-indanol produced is 7-alkyl-5-alkylated-4-indanol or 5-alkyl-7-alkylated-4-indanol.

Similarly, in the reaction of an olefin with an unsubstituted 5-indanol, where in the resulting alkylated-5-indanols (see Formula 4 above) each R' is a hydrogen atom, and (4) Where m is zero and n is 1, the alkylated-5-indanol produced is 6-alkylated-5-indanol;

(5) Where m is zero and n is 2, the alkylated-5-indanol produced is 4,6-dialkylated-5-indanol; and (6) Where m is 1 and n is 1, the alkylated-5-indanol produced is 6-alkyl-4-alkylated-5-indanol or 4-alkyl-6-alkylated-5-indanol.

Where, in the resulting alkylated indanols (see Formula 4 above), any R' is not a hydrogen atom but a radical within the definition of R' above, herein termed "alkyl" using that term in a broad sense to include all hydrocarbon radicals within the definition of R', as explained above with respect to R, then each of the many alkylated indanols indicated above may have numerous distinct derivatives. Examples of the alkyl derivatives of 5-alkylated-4-indanol of paragraph (1) above, in which certain of the R's are "alkyl" groups attached to carbon atoms in the bivalent 1-, 2- and/or 3-positions of the indan group, include 1-alkyl-5-alkylated-4-indanol, 1,1-dialkyl-5-alkylated-4-indanol, 3-alkyl-5-alkylated-4-indanol, 3,3-dialkyl-5-alkylated-4-indanol, 1,1,3-trialkyl-5-alkylated-4-indanol, 1,1,3,3-tetraalkyl-5-alkylated-4-indanol, and so on with the different combinations of alkyl substitutes in the bivalent 1-, 2- and/or 3-positions of the indan group. Examples of the 7-alkylated-4-indanols having alkyl groups in the 1-, 2- and 3-positions, are 1,5-dialkyl-7-alkylated-4-indanol, 1,1,5-trialkyl-7-alkylated-4-indanol, 1,1,3,5-tetraalkyl-7-alkylated-4-indanol, and so on with the many combinations of R's in the bivalent 1-, 2- and/or 3-positions of the indan group. Examples of similar derivatives of 6-alkylated-5-indanol of paragraph (4) above, include 1-alkyl-6-alkylated-5-indanol, 1,1-dialkly-6-alkylated-5-indanol, 3-alkyl-6-alkylated-5-indanol, 3,3-dialkyl-6-alkylated-5-indanol, 1,1,3-trialkyl-6-alkylated-5-indanol, 1,1,3,3-tetraalkyl-6-alkylated-5-indanol; and so on with different combinations of alkyl substitution in the bivalent 1-, 2- andüor 3-positions of the indan group.

Examples of the alkyl derivatives of the 5,7-dialkylated-4-indanol of paragraph (2) above in which one or more of the R's are alkyl groups attached to one or more of the carbon atoms in the bivalent 1-, 2- and/or 3-positions include 1-alkyl-5,7-dialkylated-4-indanol, 1,1-dialkyl-5,7-dialkylated-4-indanol, 1,1,3-trialkyl-5,7-dialkylated-4-indanol, 1,1,3,3-tetraalkyl-5,7-dialkylated-4-indanol, and so on with different combinations of alkyl substitution in the bivalent 1-, 2- and/or 3-positions of the indan group. Similarly, the alkyl derivatives of 4,6-dialkylated-5-indanol of paragraph (5) above include 1-alkyl-4,6-dialkylated-5-indanol, 1,1 - dialkyl - 4,6 - dialkylated-5-indanol, 1,1,3-trialkyl-4,6-dialkylated-5-indanol, 1,1,3,3-tetraalkyl-4,6-dialkylated-5-indanol, and so on with the different combinations of alkyl substitution in the bivalent 1-, 2- and/or 3-positions of the indan group.

Examples of the alkyl derivatives of the 7-alkyl-5-alkylated-4-indanol of the paragraph (3) above include 1-alkyl-7-alkyl-5-alkylated-4-indanol, 1,1 - dialkyl-7-alkyl-5-alkylated-4-indanol, 1,1,3-trialkyl-7-alkyl-5 - alkylated-4-indanol, and so on with the different combinations of alkyl substitution in the bivalent 1-, 2- and/or 3-positions of the indan groups. Similarly, examples of the alkyl derivatives of the 6-alkyl-4-alkylated-5-indanol of the paragraph (6) above include 1-alkyl-6-alkyl-4-alkylated-5 - indanol, 1,1-alkyl-6-alkyl-4-alkylated-5-indanol, 1,1,3-trialkyl-7-alkyl-4-alkylated-5-indanol, and so on with the different combinations of alkyl substitution in the bivalent 1-, 2- and/or 3-positions of the indan group. Where all the alkyl groups in any of the above named compounds represent the same hydrocarbon radical, the alkyl groups may be written together thus: 1,1,3-trialkyl-7-alkyl-5-alkylated-4-indanol may be written 1,1,3,7-tetraalkyl - 5 - alkylated - 4 -indanol, or where each alkyl group represents methyl and the alkylating olefin is isobutylene, the compound may be written 1,1,3,7-tetramethyl-5-t-butylated-4-indanol. Again where the alkyl groups do not all represent the same hydrocarbon radical, as where methyl groups are attached to the carbon atom in the 1-position, an ethyl group to the carbon atom in the 3-position, an octyl group to the carbon atom in the 7-position and the alkylating olefin is isobutylene, the 1,1,3,7-tetraalkyl-5-alkylated-4-indanol may be written 1,1 - dimethyl-3-ethyl-7-octyl-5-t-butylated-4-indanol.

In carrying out the reactions between the above described indanols and olefins, a suitable catalyst is preferably employed. Satisfactory results have been obtained with such acidic condensation catalysts as sulfuric acid, p-toluene sulfonic acid, boron trifluoride, acid activated clays, and the like. Particularly useful are combinations such as sulfuric acid and finely-divided acid activated clay. The use of acid activated clay is particularly advantageous since the reaction mixture has only to be filtered and the solvent removed to be ready for use. In addition, the acid activated clay removes many colored and otherwise undesirable reaction by-products.

The acid activated clays preferred are those whose major component is aluminum silicate in an amount preferably greater than 50 percent. The clay is preferably of such particle size that greater than 90 percent of the particles will pass a 325 mesh screen and have a particle size less than 0.05 millimeter, although clays of coarser particle sizes have been satisfactorily employed. The acid activated clay preferably has an acid reaction, or is acid treated, with a pH between 1 and 6. Such a clay is available on the market as Retrol acid activated clay. The amount of clay employed may be from 0.5 to 10 weight percent of the reactants, or more. The amount of other acid catalysts utilized in the reaction may be varied quite widely but is generally from 0.1 to about 5.0 weight percent of the reactants, although from about 0.5 to 10 weight percent may be employed.

The amount of the reaction product of this invention that may be effectively employed in rubber compositions ranges from 0.3 to about 10 weight percent based on the rubber, whereas to obtain maximum value of the deterioration retarder an amount ranging from about 0.5 to 5 weight percent on the rubber will give satisfactory results.

The term "rubber" is employed in this application in a generic sense to include all natural and synthetic unsaturated rubbery polymeric materials. The term "rubbery diolefinic polymer" is employed in this application in a broad generic sense to include the various natural rubbers, which are regarded as naturally occurring isoprene polymers, and such synthetic rubbers as polymers of conjugated dienes, such as butadiene-1,3, isoprene, piperylene, chloroprene, cyano-butadiene-1,3, as well as copolymers of these conjugated dienes with each other, and also copolymers of any of these conjugated dienes with other unsaturated chemical compounds copolymerizable therewith such as styrene, chlorostyrene, isobutylene, acrylonitrile, methacrylonitrile, acrylic and methacrylic acids, alkyl acrylates and methacrylates, vinylidene chloride, vinyl pyridines and the like.

In general, in the preparation of the reaction products of this application, the reaction is carried out in any of the standard reaction vessels, since the temperatures and pressures employed are relatively low and necessitate no special equipment. Preferably the reaction vessel is equipped with a thermometer, an agitator, a reflux condenser venting to the atmosphere, an inlet tube for introducing fluids into the bottom portion of the vessel and/or a liquid dropper for feeding liquids dropwise into the vessel.

In general, the reaction of the indanols and the alpha-olefins is carried out at substantially atmospheric pressures and at temperatures ranging from 25° to 95° C. but it is to be understood that the temperatures at which the reaction takes place are not critical.

EXAMPLE I

A reaction vessel is equipped with a thermometer, agitator, reflux condenser and inlet tube for introducing gaseous olefins into the bottom of the vessel beneath the surface of the liquids therein.

The reaction vessel is charged with 268 g. (2 moles) of 5-indanol, 400 milliliters of benzene and 25 g. of Retrol acid activated clay. The mixture is warmed to 55° C. and isobutylene is introduced through the inlet tube beneath the surface of the liquid with agitation. The isobutylene is added as rapidly as it is taken up at 55° to 80° C. over a period of about 3½ hours. Addition is continued for some time after the uptake becomes very slow to secure a maximum yield, although this is not necessary. The reaction mixture is then suction filtered to remove the acid activated clay, and the filtrate is distilled to remove the benzene. The residue is distilled under reduced pressure to give 380 g. (87.1% yield) of 6-t-butylated-5-indanol, having a boiling point of 143° to 146° C. at 9 mm., and a melting point of 74° to 76.5° C. An analysis of the end product confirms the chemical constitution to be that of 6-t-butylated-5-indanol.

EXAMPLE II

This example illustrates the preparation of the t-butylated-4-indanols and is carried out in the apparatus described in Example I.

The reaction vessel is charged with 50 g. (0.375 mole) of 4-indanol, 100 milliliters of benzene and 10 g. of Retrol acid activated clay. Isobutylene is introduced and the reaction carried out as described in Example I. The reaction mixture is suction filtered and the benzene distilled off. The distillation of the residue under reduced pressure gives two fractions: (1) 15.9 g. of 5-t-butylated-4-indanol having a boiling point of 132° to 143° C. at 6 mm. and a melting point of 49.5° to 57° C.; and (2) 43.9 g. of 5,7-di-t-butylated-4-indanol having a boiling point of 95° to 103° C. at 0.3 mm. and a melting point of 58° to 61° C. An analysis of each of these products confirms its identity.

EXAMPLE III

This example illustrates the production of 6-octylated-5-indanol by reacting 5-indanol with diisobutylene.

The reaction is carried out in the apparatus described in Example I, except that a dropper is employed to introduce the diisobutylene.

The reaction vessel is charged with 134 g. (1 mole) of 5-indanol, 250 milliliters of glacial acetic acid and 5 milliliters of concentrated sulfuric acid. The vessel contents are warmed to 50° C. and 114 g. (1.1 moles) of diisobutylene is added dropwise with agitation. During the approximately two hour period the diisobutylene is being added, the reaction mixture is warmed to about 70° C. After heating the vessel contents with agitation at from 70° to 90° C. for nine hours, the reaction mixture is poured into water. Benzene is added and an organic layer is decanted off, washed, dried and concentrated. The benzene and any unreacted 5-indanol is removed by distillation. The residue is distilled under reduced pressure to yield 99 g. of 6-octylated-5-indanol having a boiling range of 87° to 107° C. at 0.3 mm., which is a colorless oil that crystallizes readily to give a waxy solid having a melting point of 49° to 60° C. Analysis confirms the identity of the end product.

EXAMPLE IV

The preparation of 6-alpha-methylbenzylated-5-indanol is accomplished by the reaction of 5-indanol and styrene, thus:

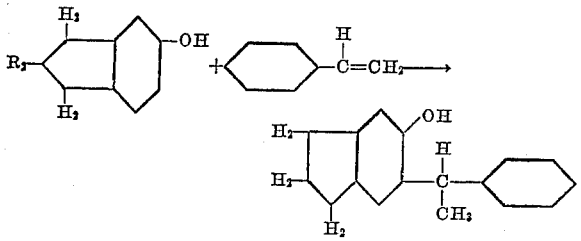

The reaction is carried out in the apparatus described in Example III. The reaction vessel is charged with 134 g. (1 mole) of 5-indanol, 200 milliliters of benzene and 20 g. of Retrol acid activated clay. The mixture is warmed to about 50° C. and styrene is added dropwise with stirring over a period of 45 minutes. Heating and stirring are continued at near reflux temperatures for 2 hours. The vessel contents are suction filtered to remove the acid activated clay. The filtrate is distilled to remove the benzene and any surplus indanol. The residue is distilled under reduced pressure. There is produced 132.5 g. of 6-alpha-methylbenzylated-5-indanol, having a boiling point of 139° to 141° C. at 0.4 mm. The 6-alpha-methylbenzylated-5-indanol is a colorless oil which does not crystallize. Analysis of the end product confirms its chemical structure.

*Evaluation of reaction products of examples I to IV*

(a) PREPARING TEST DUMBBELLS

The efficacy of the reaction products of Examples I to IV above as flex-cracking resisters and heat stabilizers in vulcanized rubber products is demonstrated by incorporating each such reaction product in a standard natural rubber tread stock recipe, curing in a steam press, and then testing. The tread stock recipe employed for this test is:

| Ingredients: | Parts by weight |
|---|---|
| Natural crude rubber | 100.0 |
| Carbon black | 50.0 |
| Zinc oxide | 5.0 |
| Stearic acid | 3.0 |
| Sulfur | 3.0 |
| Bis(2-benzothiazyl)-disulfide (accelerator) | 1.0 |
| Reaction product of Examples I to IV | 1.0 |

Four rubber stocks, each compounded in accord with the above recipe and one containing each of the four reaction products of Examples I to IV, are compounded and cured. A blank stock, that is, one without a deterioration retarder, but otherwise the same as the above recipe, and a control stock having 1 part of phenyl-beta-naphthylamine replacing the 1 part of the reaction product of the above recipe, are also compounded and cured under like conditions for comparison purposes.

(b) DETERMINING HEAT STABILITY AND FLEX-LIFE AFTER AGING

Each of the compounded stocks referred to in the preceding paragraph is cured in a regulation steam press at 280° F. for 50 and 80 minutes and then aged. The aging follows the standard ASTM procedure (D865–48T). Test dumbbell strips are cut from the vulcanized stocks and aged in open test tubes for 24 and 48 hours at 212° F. Some of these aged test strips are subjected to stress-strain tests. Others of the aged test strips, which are aged for 24 hours at 212° F., are subjected to flexing tests in the DeMattia Flexing Machine, where the test strips are flexed and the number of flexures automatically counted and recorded. The following test results are obtained:

| Test Dumbbells | Percentage of Original Tensile Strength Retained After Aging at 212° F | | | | Flex-Life | |
|---|---|---|---|---|---|---|
| | 24 Hrs. 50″ Cure | Aging 80″ Cure | 48 Hrs. 50″ Cure | Aging 80″ Cure | No. of Flexes to Failure | Improvement Times over Blank |
| Blank—no deterioration retarder | 56 | 46 | 32 | 31 | 30,000 | 1.0 |
| Control—Phenyl-beta-naphthylamine | 78 | 64 | 55 | 49 | 132,000 | 4.4 |
| Reaction Product—Example I | 101 | 86 | 89 | 76 | 254,000 | 8.5 |
| Reaction Product—Example II | 98 | 85 | 86 | 78 | 231,000 | 7.7 |
| Reaction Product—Example III | 101 | 95 | 96 | 87 | 252,000 | 8.4 |
| Reaction Product—Example IV | 98 | 88 | 91 | 85 | 240,000 | 8.0 |

From the above tabulation, it will be observed that the heat-stabilizing properties of the reaction products of the Examples I to IV are markedly superior to those of the blank and of the phenyl-beta-naphthylamine, one of the most widely used antioxidants, and the flex-life of the rubber tread stocks, compounded with the reaction products of Examples I to IV, is from 4 to 8 times longer than that of the blank stock and about 2 times longer than that of the stock containing phenyl-beta-napthylamine.

Applicant has found that alkylated indanols other than those hereinabove specifically mentioned have comparable excellent heat-stabilizing and flexing-life properties. Some of these include 6-ethylated-5-indanol, 4,6-diethylated-5-indanol, 5-ethylated-4-indanol, 5,7-diethylated-4-indanol, 6-isopropylated-5-indanol, 4,6-di-isopropylated-5-indanol, 5-isopropylated-4-indanol, 5,7-di-isopropylated-4-indanol, 6-t-butylated-5-indanol, 4,6-di-t-butylated-5-indanol, 5-t-butylated-4-indanol, 5,7-di-t-butylated-4-indanol, 6-t-octylated-5-indanol, 4,6-di-octylated-5-indanol, 5-t-octylated-4-indanol, 5,7-di-octylated-4-indanol, and like alkylated indanols in which the alkylating olefins contain the hydrocarbon radical R″ within the scope above noted; and also 1,3-dimethyl-6-ethylated-5-indanol,
1,3-dimethyl-4,6-diisopropylated-5-indanol,
1,3-dimethyl-6-t-butylated-5-indanol,
1,3-dimethyl-5-t-butylated-4-indanol,
1,1-dimethyl-4,6-di-t-butylated-5-indanol,
1,1-dimethyl-3-isopropyl-6-t-butylated-5-indanol,
1,1-dimethyl-4,6-di-t-butylated-5-indanol,
1,1dimethyl-3-isopropyl-4,6-di-t-butylated-5-indanol,
1,1,3-trimethyl-6-isopropylated-5-indanol,
1,1,3-trimethyl-5-isopropylated-4-indanol, 1,1,3-trimethyl-6-t-butylated-5-indanol,
1,1,3-trimethyl-5-t-butylated-4-indanol, and like higher homologues thereof, as well as 1,3-dimethyl-6-alpha-methylbenzylated-5-indanol,
1,3-dimethyl-5-alpha-methylbenzylated-4-indanol,
1,1,3-trimethyl-6-alpha-methylbenzylated-5-indanol and the like.

Numerous other alkylated indanols have been prepared and tested as deterioration retarders and have all shown on test to be excellent deterioration retarders.

On the basis of the tests made, the generalization is warranted that the alkylation products of indanols and substituted indanols of the character hereinabove described are as a class highly effective as deterioration retarders, and impart to vulcanized rubber remarkably high anti-flex-cracking and heat stabilizing properties, very effective resistance to deterioration of tensile strength, elongation and other desirable properties, and are moreover non-staining and non-discoloring deterioration retarders.

It is not the intention of the applicant to limit the invention of this application to the specific disclosures herein set forth, which have been presented as illustrative, since modifications in the proportions and the types of materials employed may be varied and equivalent materials may be employed, where desirable, without departing from the spirit or scope of this invention as defined in the appended claims.

What is claimed is:
1. A sulfur-vulcanized rubbery composition comprising a rubbery diolefinic polymer in which is dispersed from 0.3 to 10 parts by weight on the said polymer of a highly effective heat stabilizing and superior anti-flex-cracking deterioration retarder resulting from the chemical reaction between an indanol and an alpha-olefin, the indanol being of the general formula

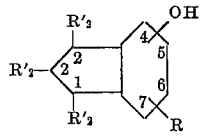

wherein R is a monovalent substituent selected from the class consisting of hydrogen and alkyl and aralkyl radicals having from 1 to 8 carbon atoms, R' is a monovalent substituent selected from the class consisting of hydrogen and alkyl radicals having from 1 to 8 carbon atoms, the alpha-olefin being of the general formula

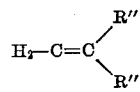

wherein R" is a monovalent substituent selected from the class consisting of hydrogen and alkyl and aralkyl radicals having from 1 to 8 carbon atoms, the resulting reaction producing a deterioration retarder of the general formula

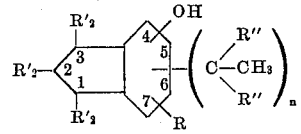

wherein each R and R" is a monovalent substituent selected from the class consisting of hydrogen and alkyl and aralkyl radicals having from 1 to 8 carbon atoms, R' is a monovalent substituent selected from the class consisting of hydrogen and alkyl radicals having from 1 to 8 carbon atoms, and $n$ is an integer ranging from 1 to 2.

2. The sulfur-vulcanized rubbery composition defined in claim 1 wherein the highly effective heat stabilizing and superior anti-flex-cracking deterioration retarder comprises 6-t-butyl-5-indanol.

3. The sulfur-vulcanized rubbery composition defined in claim 1 wherein the highly effective heat stabilizing and superior anti-flex-cracking deterioration retarder comprises 5-t-butyl-4-indanol.

4. The sulfur-vulcanized rubbery composition defined in claim 1 wherein the highly effective heat stabilizing and superior anti-flex-cracking deterioration retarder comprises 5,7-di-t-butyl-4-indanol.

5. The sulfur-vulcanized rubbery composition defined in claim 1 wherein the highly effective heat stabilizing and superior anti-flex-cracking deterioration retarder comprises 4,6-di-t-butyl-5-indanol.

6. The sulfur-vulcanized rubbery composition defined in claim 1 wherein the highly effective heat stabilizing and superior anti-flex-cracking deterioration retarder comprises 6-methylbenzyl-5-indanol.

References Cited in the file of this patent
UNITED STATES PATENTS

| | | |
|---|---|---|
| 2,109,015 | Niederl | Feb. 22, 1938 |
| 2,198,374 | Bruson | Apr. 23, 1940 |
| 2,731,442 | Forman | Jan. 17, 1956 |
| 2,731,443 | Forman | Jan. 17, 1956 |
| 2,754,285 | Petropoulis | July 10, 1956 |

UNITED STATES PATENT OFFICE
CERTIFICATION OF CORRECTION

Patent No. 2,948,704 — August 9, 1960

Roger E. Morris

It is hereby certified that error appears in the above numbered patent requiring correction and that the said Letters Patent should read as corrected below.

Column 1, line 55, for "on" read -- or --; column 2, lines 25, 49, 51, 55, and 60, and column 3, lines 1 and 47, for "Formula 1", each occurrence, read -- Formula (1) --; column 3, line 48, for "Formula 3" read -- Formula (3) --; line 59, for "Formulas 1 and 3" read -- Formulas (1) and (3) --; column 4, line 14 and 30, for "Formula 4", each occurrence, read -- Formula (4) --; line 40, for "mula 4" read -- mula (4) --; column 5, line 17, for "groups" read -- group --; column 7, lines 25 to 35, the left-hand portion of the formula should appear as shown below instead of as in the patent:

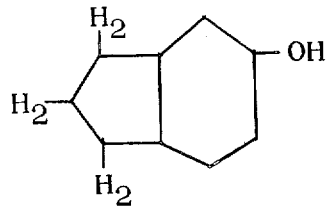

column 9, lines 40 to 45, the formula should appear as shown below instead of as in the patent:

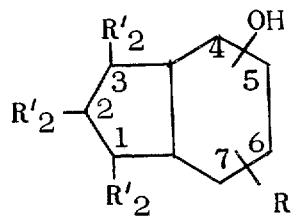

Signed and sealed this 23rd day of May 1961.

(SEAL)
Attest:

ERNEST W. SWIDER
Attesting Officer

DAVID L. LADD
Commissioner of Patents